(12) United States Patent
Poisson

(10) Patent No.: US 8,522,522 B2
(45) Date of Patent: Sep. 3, 2013

(54) FAN EMBEDDED POWER GENERATOR

(75) Inventor: Richard A. Poisson, Avon, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 404 days.

(21) Appl. No.: 12/847,299

(22) Filed: Jul. 30, 2010

(65) Prior Publication Data

US 2012/0025676 A1 Feb. 2, 2012

(51) Int. Cl.
*F02G 3/00* (2006.01)
(52) U.S. Cl.
USPC .................................................... 60/39.093
(58) Field of Classification Search
USPC ................................................... 290/1 A
See application file for complete search history.

(56) References Cited

U.S. PATENT DOCUMENTS

| | | | |
|---|---|---|---|
| 2,429,061 A * | 10/1947 | Hunter ..................... 244/134 D |
| 2,524,066 A * | 10/1950 | Andersen ........................ 62/241 |
| 2,612,228 A * | 9/1952 | Forsyth .......................... 416/155 |
| 3,528,752 A | 9/1970 | Davies |
| 3,589,132 A * | 6/1971 | Du Pont ........................... 60/262 |
| 3,900,274 A | 8/1975 | Johnston |
| 4,431,931 A | 2/1984 | Perrier et al. |
| 5,282,719 A | 2/1994 | McCarty |
| 5,474,261 A * | 12/1995 | Stolarczyk et al. ........ 244/134 F |
| 5,479,060 A | 12/1995 | Giamati et al. |
| 5,634,800 A | 6/1997 | Giamati |
| 5,709,532 A | 1/1998 | Giamati et al. |
| 5,767,605 A | 6/1998 | Giamati |
| 5,793,137 A * | 8/1998 | Smith ........................... 310/114 |
| 5,836,542 A | 11/1998 | Burns |
| 6,137,082 A | 10/2000 | Pruden et al. |
| 6,158,960 A | 12/2000 | Marsi |
| 6,181,235 B1 * | 1/2001 | Smith ........................... 318/696 |
| 6,264,138 B1 | 7/2001 | Hawkins |
| 6,492,743 B1 | 12/2002 | Appa |
| 6,503,056 B2 | 1/2003 | Eccles et al. |
| 6,769,874 B2 | 8/2004 | Arel |
| 6,811,376 B2 | 11/2004 | Arel et al. |
| 7,449,794 B2 * | 11/2008 | Guey et al. ...................... 290/44 |
| 7,588,212 B2 * | 9/2009 | Moe et al. .................. 244/134 D |
| 7,642,683 B2 | 1/2010 | Powers et al. |
| 7,656,054 B2 | 2/2010 | Lardellier |
| 7,928,345 B2 * | 4/2011 | Briggs ........................... 219/488 |
| 8,008,822 B2 * | 8/2011 | Hopewell et al. ............. 310/115 |
| 8,026,624 B2 | 9/2011 | Beutin et al. |
| 2005/0006529 A1 * | 1/2005 | Moe et al. .................. 244/134 D |
| 2005/0200349 A1 | 9/2005 | Duke |

(Continued)

FOREIGN PATENT DOCUMENTS

| DE | 1803419 A1 | 6/1969 |
|---|---|---|
| DE | 2035154 B * | 12/1977 |

(Continued)

OTHER PUBLICATIONS

European Search Report dated Sep. 7, 2011.

*Primary Examiner* — Joseph Waks
(74) *Attorney, Agent, or Firm* — Carlson, Gaskey & Olds P.C.

(57) ABSTRACT

A power generator, such as a permanent magnet alternator ("PMA") or a permanent magnet generator ("PMG"), may be used to provide electric power to a deicing system, for example. The power generator is embedded within a spinner, and may be in communication with a locally mounted electronic control unit ("ECU").

11 Claims, 2 Drawing Sheets

(56) References Cited

U.S. PATENT DOCUMENTS

| | | | |
|---|---|---|---|
| 2009/0134272 A1* | 5/2009 | Vauchel | 244/54 |
| 2009/0289516 A1* | 11/2009 | Hopewell et al. | 310/115 |
| 2010/0199629 A1* | 8/2010 | Chene et al. | 60/39.093 |
| 2011/0277443 A1* | 11/2011 | Pereira et al. | 60/39.093 |

FOREIGN PATENT DOCUMENTS

| | | |
|---|---|---|
| EP | 1405986 A2 | 4/2004 |
| EP | 2022946 A1 * | 2/2009 |
| FR | 2928625 A1 * | 9/2009 |
| GB | 2425572 A | 11/2006 |
| JP | 2009299656 A * | 12/2009 |

* cited by examiner

FAN EMBEDDED POWER GENERATOR

BACKGROUND

This disclosure relates to a power generator, which may be a permanent magnet alternator ("PMA") or a permanent magnet generator ("PMG").

Turbine engines are known to include power generators attached to a gearbox. Such power generators are configured to provide power to various devices mounted on the engine, including propeller blade angle controllers and engine inlet deicing systems. In particular, power is routed from these power generators to the engine-mounted devices by a power distribution panel that is located away from the engine, such as within an aircraft's fuselage. Thus, long power lines are required to transmit power from the power generators to the power distribution panel, and from the power distribution panel to the engine-mounted devices.

SUMMARY

A turbine engine includes a spinner and a plurality of blades projecting radially outward from the spinner. A power generator may be embedded within the spinner.

An electronic control unit may be in communication with the power generator. Additionally, a device, which may be an engine-mounted device such as a deicing element, is in communication with the electronic control unit.

Further disclosed is a spinner that may include an outer spinner housing. A power generator may be embedded within the spinner such that the outer spinner housing radially surrounds at least a portion of the power generator.

These and other features can be best understood from the following detailed description and drawings.

BRIEF DESCRIPTION OF THE DRAWINGS

The drawings that accompany the following detailed description can be briefly described as follows.

DETAILED DESCRIPTION

Figure 1:
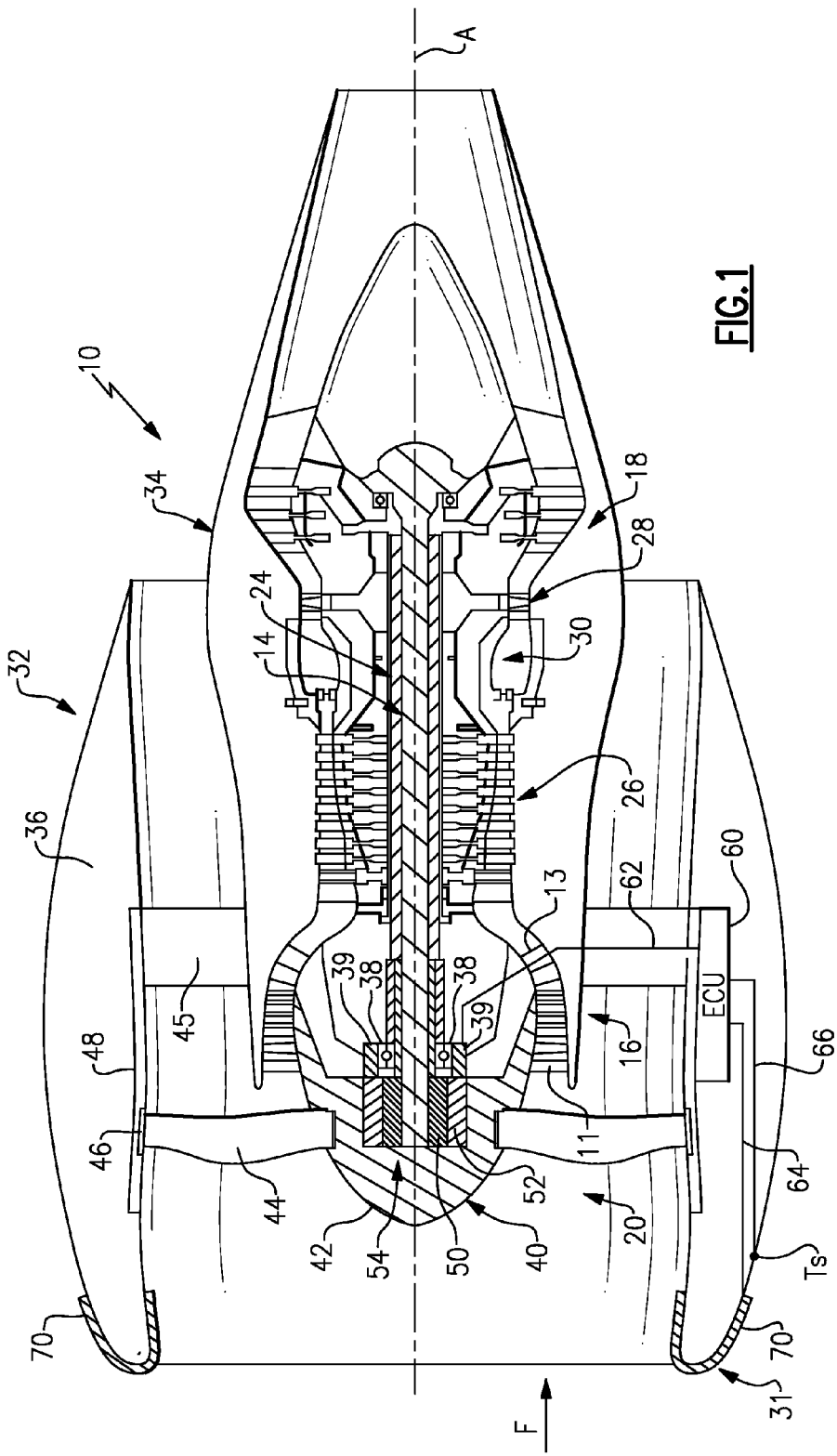
FIG. 1 is a general schematic view of an exemplary gas turbine engine including the power generator of this disclosure.

FIG. 1 illustrates a general schematic view of an exemplary gas turbine engine 10. As shown, the exemplary engine 10 is in the form of a two spool high bypass turbofan engine. While this particular type of gas turbine engine is illustrated and described, it should be understood that this disclosure is applicable to other gas turbine engine configurations, including, for example, turboprops, turbojet engines, low bypass turbofan engines, turboshaft engines, etc. This disclosure is further applicable outside the context of thrust generating turbine engines, and may be applicable for use in wind turbines, for example.

The exemplary engine 10 houses two coaxial engine shafts, a low spool 14 and high spool 24, each of which rotate about an engine axis of rotation A. A low pressure compressor 16 and a low pressure turbine 18 are in cooperation with the low spool 14. The low pressure compressor 16 includes alternating rows of rotary airfoils, or blades, 11 and static airfoils, or vanes, 13. Further included is a fan section 20 connected to the low spool 14 either directly or indirectly. The high spool 24 of the exemplary engine 10 cooperates with a high pressure compressor 26 and high pressure turbine 28. A combustor 30 is arranged between the high pressure compressor 26 and the high pressure turbine 28. As depicted, the fan section 20 is provided with an inlet air flow F, which is subsequently compressed in the compressors 16, 26, mixed with fuel, burned in the combustor 30, and expanded in the turbines 18, 28.

The exemplary engine 10 is mounted within a nacelle assembly 32 defined by a fan nacelle 36, which radially surrounds the fan section 20, and a core nacelle 34. The fan section 20 includes a plurality of circumferentially spaced fan blades 44, which project radially outward from the spinner 40. As shown, the spinner 40 is directly connected to the low spool 14 such that the spinner 40 rotates with rotation of the low spool 14. While the spinner 40 rotates with the low spool 14, the spinner 40 and the low spool 14 are separate structures. Further, an annular blade containment structure 46 may be disposed within a fan case 48 which circumferentially surrounds the path of the fan blades 44. Stator vanes 45 may be provided downstream, with respect to inlet flow F, of the fan blades 44.

As shown, a power generator 54, which may be a PMA or a PMG, is embedded within the fan section 20. In one example, the power generator 54 is embedded in the spinner 40 and includes a rotor 50 and a stator 52. The rotor 50 is rotatably coupled to the spinner 40, and thus it rotates with rotation of the low spool 14. The stator 52 is rotatably fixed relative to the rotor 50 by way of a grounding structure 39 which may extend from the core nacelle 34, however the stator 52 may be rotatably fixed relative to the rotor 50 in other ways. A bearing structure 38 rotatably supports the low spool 14, and cooperates with the grounding structure 39. As shown, the bearing structure 38 is disposed downstream (relative to inlet air flow F) of the power generator 54.

As seen in FIG. 1, an outer spinner housing 42 radially surrounds the entire power generator 54. That is, the power generator 54 does not extend axially beyond the outer spinner housing 42 and thus the power generator 54 is wholly embedded within the spinner 40. Stated another way, the outer spinner housing 42 radially overlaps the entire power generator 54. As shown, the outer spinner housing 42 extends upstream (relative to inlet air flow F) and downstream of the fan blades 44. Further, the engine shafts, or the low spool 14 and high spool 24, do not radially overlap the power generator 54. Rather, the power generator 54 radially overlaps the low spool 14.

In some instances, the power generator 54 may extend axially beyond the outer spinner housing 42 while remaining at least partially embedded within the spinner 40. In these instances, the outer spinner housing 42 will radially surround (or, radially overlap) at least part of the power generator 54. In either case, by at least partially embedding the power generator 54 within the spinner 40, the power generator 54 will remain relatively cool by virtue of the spinner 40 being exposed to the inlet air flow F.

During operation of the exemplary engine 10, the low spool 14 rotates in response to rotation of the low pressure turbine 18. The rotor 50 likewise rotates with the low spool 14 relative to the stator 52. The stator 52 may be a permanent magnet and the rotor 50 may include conductive wire coils, or, in the alternative, the stator 52 may include conductive wire coils and the rotor 50 may be a permanent magnet. In either case, the rotation of the rotor 50 relative to the stator 52 converts mechanical energy into electrical energy, ultimately generating electric power. This electric power is communicated to an electronic control unit ("ECU") 60 by way of an electrical harness 62. The electrical harness 62 may be routed to the power generator 54 by way of stator vanes 45, 13 and grounding structure 39, though the electrical harness 62 may be routed to the power generator 54 in any suitable manner.

In FIG. 1, the ECU 60 is positioned within the fan nacelle 36, on a radially outer portion of the fan case 48. This configuration may be useful because the ECU 60, which includes a processor, may become hot and the fan nacelle 36 is relatively cool when compared to the remainder of the exemplary engine 10.

Because the fan nacelle 36 can become cool relative to the rest of the exemplary engine 10, ice may form on the fan nacelle 36. Ice formation is undesirable, as pieces of ice may cause damage to components of the exemplary engine 10. Accordingly, the fan nacelle 36 may include a deicing system 31, which includes several deicing elements 70 arranged about a leading edge (near inlet flow F) of the fan nacelle 36. These deicing elements 70 may be an electrically resistive heating grid, for example. The ECU 60 may be in communication with the deicing elements 70 by way of an electrical harness 64. The ECU 60 may further be in communication with a temperature sensor $T_S$ by way of another electrical harness 66. The deicing system 31 may also represent an anti-icing system that prevents the formation of ice using the deicing elements 70 as anti-icing elements.

Figure 2:
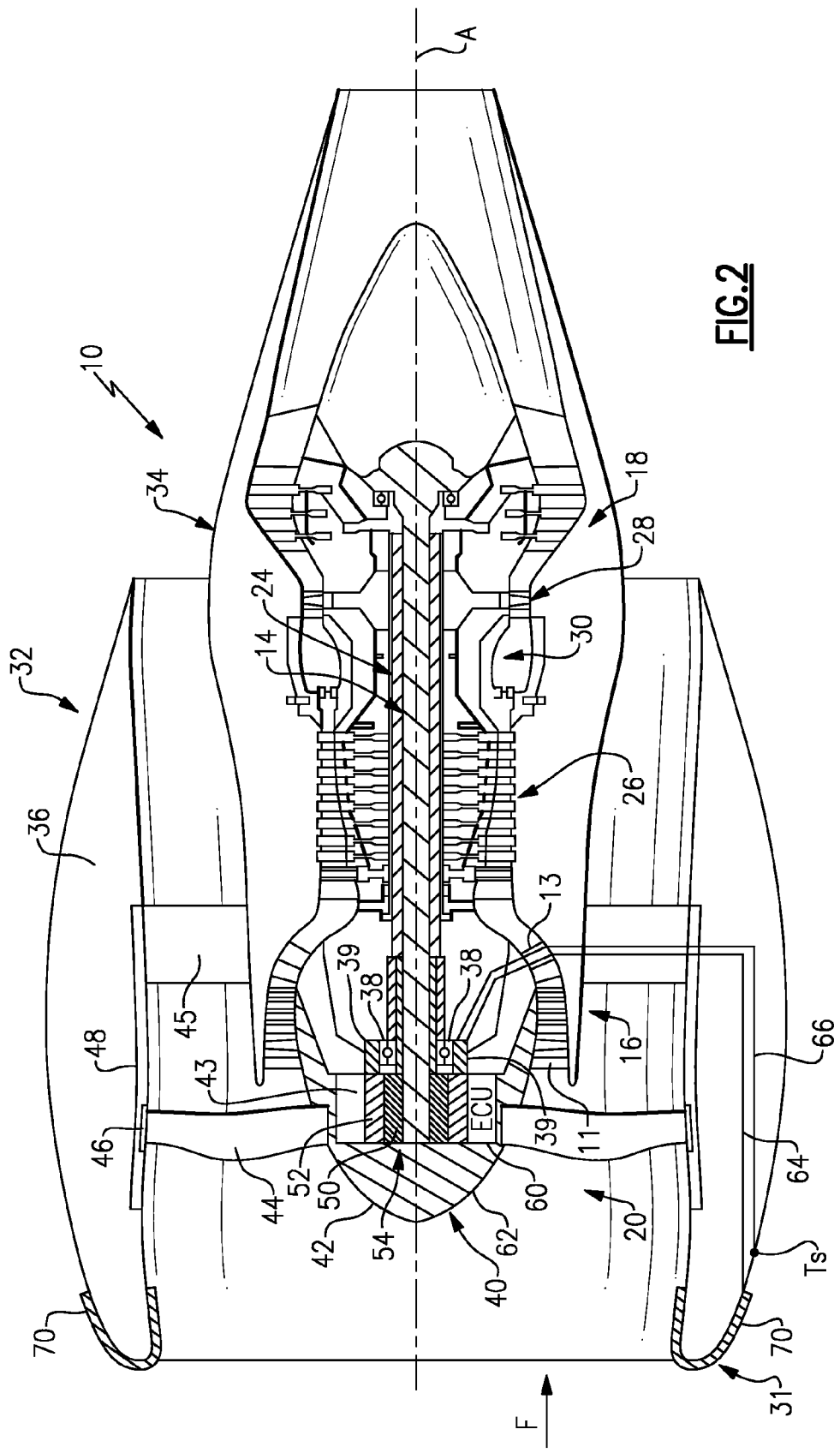
FIG. 2 is another general schematic view of an exemplary gas turbine engine, showing the power generator and an electronic control unit embedded within the fan section of the exemplary engine.

In FIG. 2, the ECU 60 is embedded within the spinner 40, along with the power generator 54. Embedding the ECU 60 within the spinner 40 may allow for elimination of the electrical harness 62, shown in FIG. 1. Thus, only the electrical harnesses 64, 66 may be needed. The electrical harnesses 64, 66 may be routed from the ECU 60 to the deicing elements 70 and the temperature sensor $T_S$, respectively, via the grounding structure 39 and the stator vanes 13, 45. Also, embedding the ECU 60 within the spinner 40 provides effective cooling of the ECU 60 by virtue of the spinner 40 being exposed to the inlet air flow F. Notably, in the configuration of FIG. 2, material may be removed from the spinner 40, relative to FIG. 1, in order to accommodate the ECU 60. For example, the ECU 60 is shown as being connected to the stator 52, and thus the spinner 40 may be provided with a circumferential recess 43 such that the ECU 60 does not interfere with rotation of the spinner 40.

As mentioned, the ECU 60 is in electrical communication with the deicing system 31. Specifically, the ECU 60, which includes a processor, is configured to control the deicing system 31 and to provide electric power from the power generator 54 to the deicing system 31. For example, the ECU 60 is in communication with a temperature sensor, or a plethora of temperature sensors, $T_S$ which sense the temperature of the fan nacelle 36 and report the sensed temperature to the ECU 60. Based on, among other things, this sensed temperature, the ECU 60 determines whether conditions for ice formation are present. If conditions warrant, the deicing system 31 is activated, and electric power from the power generator 54 is provided to the fan nacelle 36, thereby deicing the fan nacelle 36 and substantially preventing ice formation.

The particulars of the control logic of the deicing function of the ECU 60 may vary. However, in this respect, it will be important for the ECU 60 to be configured to prevent excessive heat from damaging the fan nacelle 36 or causing any other unsafe condition to exist.

In each of FIGS. 1 and 2, the power generator 54 and the ECU 60 are configured to provide local power to the deicing system 31. These disclosed configurations, however, are not limited to use with deicing systems 31 and may be used to provide local power to a variety of devices. For example, the disclosed power generator 54 and ECU 60 may be used with a turboprop or a wind turbine to locally control the operation of a propeller blade angle controller.

A worker of ordinary skill in this art would recognize that certain modifications of the instant disclosure would come within the scope of the claims. As explained, this disclosure has been shown and described with reference to the exemplary engine 10, however it may be implemented in other turbines, such as turboprops. This disclosure may also be useful in wind turbines. Accordingly, the following claims should be studied to determine their true scope and content.

What is claimed is:

1. A turbine engine comprising:
   a spinner;
   a plurality of blades projecting radially outward from the spinner;
   a power generator embedded within the spinner; and
   an electronic control unit positioned within a nacelle radially surrounding a fan section of the turbine engine, wherein the electronic control unit is positioned radially outward of the blades.

2. The turbine engine of claim 1, wherein the power generator is one of a permanent magnet alternator and a permanent magnet generator.

3. The turbine engine of claim 2, wherein the spinner is directly connected to an engine shaft, such that rotation of the engine shaft rotates the spinner.

4. The turbine engine of claim 3, wherein the power generator is wholly embedded within the spinner.

5. The turbine engine of claim 3, wherein the power generator includes a rotor and a stator.

6. The turbine engine of claim 1, wherein the electronic control unit is in communication with the power generator.

7. The turbine engine of claim 1, wherein the spinner is configured to rotate with rotation of a spool of the turbine engine.

8. The turbine engine of claim 1, wherein the electronic control unit is in communication with a device positioned on the turbine engine.

9. The turbine engine of claim 8, wherein the device includes a deicing element positioned on a leading edge of the nacelle.

10. A spinner configured to support a plurality of blades and rotate about an axis, the spinner comprising:
    an outer spinner housing; and
    a power generator embedded within the spinner such that the outer spinner housing radially surrounds the entire power generator, wherein the power generator includes a rotor and a stator, the rotor rotating with rotation of the spinner, and wherein the power generator is one of a permanent magnet alternator and a permanent magnet generator; and
    an electronic control unit embedded within the spinner such that the outer spinner housing radially surrounds at least a portion of the electronic control unit.

11. The spinner of claim 10 wherein the spinner is configured to rotate with rotation of a spool of a gas turbine engine.

* * * * *